United States Patent [19]

Powell et al.

[11] Patent Number: 5,309,160
[45] Date of Patent: May 3, 1994

[54] RADAR SYSTEM AND METHOD HAVING VARIABLE TRACKING RANGE

[75] Inventors: Norman F. Powell, Catonsville; Carl E. Nothnick, Pasadena, both of Md.

[73] Assignee: Westinghouse Electric Corp., Pittsburgh, Pa.

[21] Appl. No.: 360

[22] Filed: Jan. 4, 1993

[51] Int. Cl.⁵ .............................. G01S 13/34
[52] U.S. Cl. .................... 342/128; 342/200
[58] Field of Search ................ 342/128, 200

[56] References Cited

U.S. PATENT DOCUMENTS 5,134,411  7/1992  Adler ........................ 342/128 X Primary Examiner—T. H. Tubbesing
Attorney, Agent, or Firm—W. G. Sutcliff

[57] ABSTRACT

A segmented stretch waveform for wide band high duty cycle tracking application. The waveform is divided into multiples of two spaced segments as the tracking range closes. Target returns received during spaced segments are combined to correspond to the complete waveform; and range is determined in accordance with the combined waveform. Tracking range can be varied without changing bandwidth, FM slope, duty cycle or processing time.

13 Claims, 6 Drawing Sheets

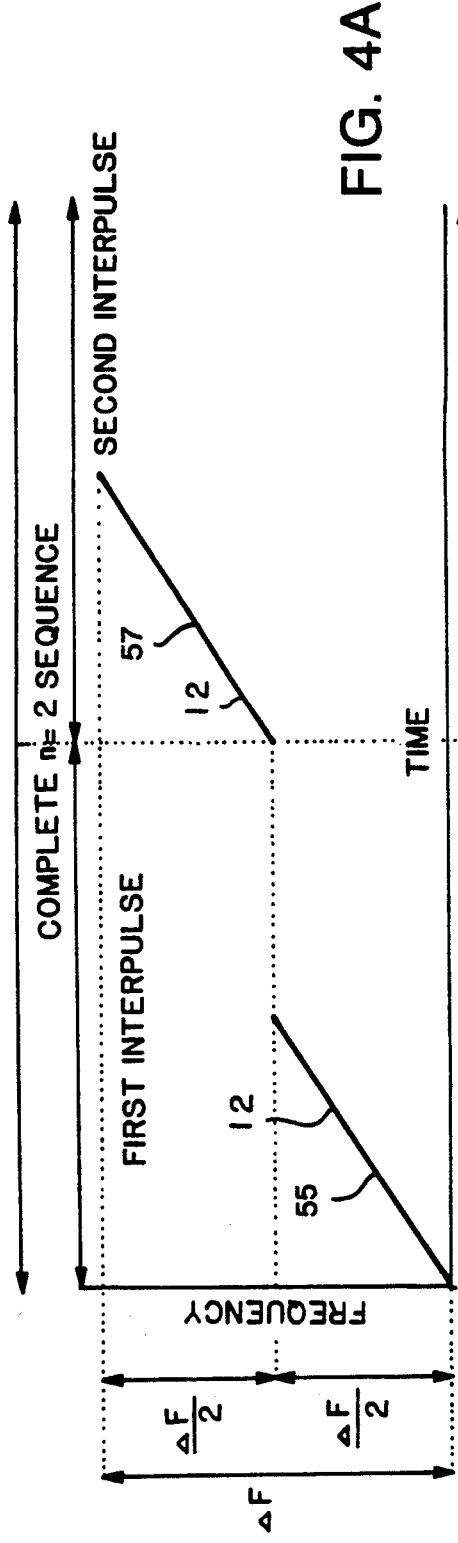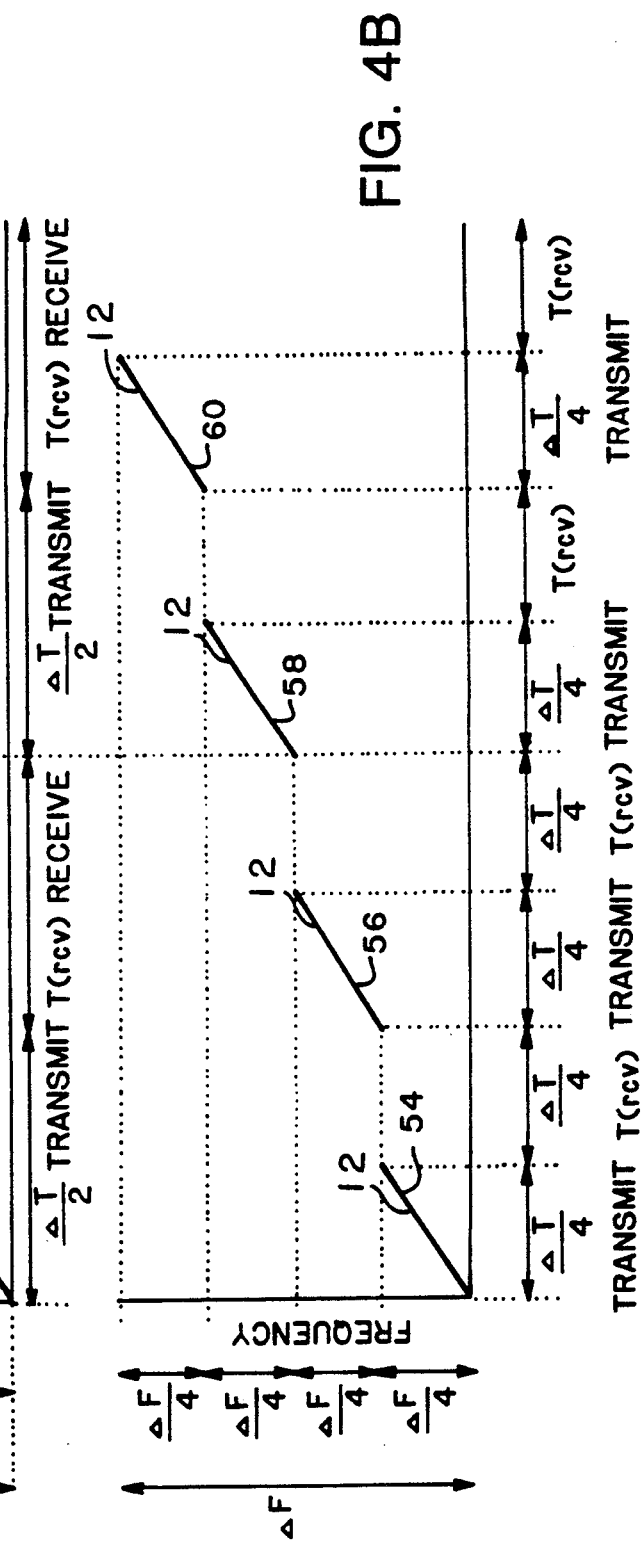

RADAR SYSTEM AND METHOD HAVING VARIABLE TRACKING RANGE

BACKGROUND OF THE INVENTION

1. Field of Invention

The present invention relates to a radar system and related method; and more particularly to a radar system and method, having the ability to vary the tracking range.

A continuous wave radar (CW) and a high pulse repetition frequency (PRF) radar are similar in that a high PRF in its basic form is a CW radar pulsed on and off at a high rate, such as several hundred kilohertz, for example; and the receiver is protected from direct transmitter leakage by a switch which is opened during the transmit period. However, in practice high PRF pulse Doppler (PD) radars are far more complex and are more effective against low flying aircraft in a heavy clutter background, in that they can discriminate more effectively between ground clutter and moving targets on a Doppler frequency basis. High average power can also be transmitted in that such system typically have approximately a 50% transmission duty factor; that is, the duration of the waveform is approximately the same as the interpulse period.

A linear FM waveform which is generated and compressed by a compression filter is sometimes referred to as a chirp waveform and is relatively simple to generate. Stretching and compression of a linear FM waveform is accomplished to retain the detection capability of a waveform of long duration while at the same time retaining the range resolution of a short pulse. A stretched waveform is generated actively by oscillator tuning a digital synthesis; and is demodulated by the first local oscillator and processed via Fast Fourier Transform. The waveform is generated from a narrow linear FM waveform by changing the relative phases of the frequency components of the waveform by a filter that distorts the phase; thus producing a stretch waveform, which is the waveform that is transmitted. The received echo is processed in a compression filter that readjusts the relative phases of the frequency components so that a narrow linear FM chirp signal is received.

One ranging method used with CW and high PRF PD radar is multiple PRF ranging which uses a moderate duty factor of one tenth or less and multiple range gated receivers. The receivers are sequentially opened for a period equal to the transmitted pulse width. A target will fall in only one or two receiver channels, which is an ambiguous range measurement; and ambiguity is resolved by cycling through several PRF's.

Another method of ranging a CW or high PRF PD radar is accomplished by applying linear frequency modulation (FM) to the microwave oscillator of the system for a short period during each transmit cycle. This application of FM modulates both the transmitted frequency and receiver local oscillator frequency, which produces a frequency or Doppler shift in the return signal that is range dependent. Thus, target signal frequency is the sum of the range frequency and Doppler frequency. By comparing with the target signal frequency when no FM is applied, the range component can be computed and displayed.

In a typical CW or high PRF linear FM Doppler radar system, a stretched waveform of a bandwidth $\Delta F$ is transmitted during a time period $\Delta T$. During the receive cycle, the FM is removed by an identical $\Delta F$, $\Delta T$ from the return signal. The target range where a radar return falls that is synchronous with the sweep time $\Delta T$ generates a CW signal of duration $\Delta T$ at an intermediate center frequency F0. Thus, the range resolution is proportional to the reciprocal of the bandwidth $\Delta F$ in accordance with the following equation.

$$dR = \frac{C}{2*\Delta F} K1*K2 \qquad \text{Equation (1.0)}$$

Where;
K1 = system processor FFT Weight widening
K2 = widening due to return signal nonsynchronous with sweep,
dR = range resolution,
$\Delta F$ = transmit bandwidth.
c = Velocity of light The minimum range is determined by the transmit time $\Delta T$. Thus, varying the tracking range can be achieved by varying $\Delta T$ while retaining $\Delta F$ at the same value. If the tracking range is to be reduced, the resolution dR in equation 1.0 remains constant, but the FM slope is increased given a constant receiver IF bandwidth. This, however creates a waveform synthesis problem. It is difficult to reduce $\Delta T$ by an appreciable factor, and still sweep the relatively wide $\Delta F$ bandwidths usually required. If constant range coverage were required, a varying IF bandwidth and digital sampling rate change would be necessary, which is cumbersome. Such a stretch system also limits the minimum range resolution and requires an increase in the slope of the FM waveform.

SUMMARY OF THE INVENTION

An object of the present invention is to provide a radar system and method that provides a waveform having a wide range resolution bandwidth with the capability of tracking targets at close ranges.

Another object of the present invention is to provide an FM transmit/receive sequence method and system for tracking targets under closing range conditions without increasing the FM slope.

Still another object of the present invention is to provide a method and system that enables a target to be tracked at variable minimum ranges as it converges in range.

A further object of the present invention is to provide a radar system and method that provides constant coverage at variable ranges without changing the IF bandwidth and digital sampling rate.

A still further object of the present invention is to provide a radar system and method where the transmission of the waveform has a high duty factor independent of range.

Yet another object of the present invention is to provide a method and radar system that provides a wide RF bandwidth with relatively low sampling rates while maintaining good Doppler sampling capability and relatively tolerant of Doppler estimate errors.

Additional objects and advantages of the invention will be set forth in part in the description which follows; and in part will be obvious from the description, or may be learned by practice of the invention. The objects and advantages of the invention may be realized and attained by means of the instrumentalities and the combinations particularly pointed out in the appended claims.

To achieve the objects, and in accordance with the purpose of the invention, as embodied and broadly described herein, a method of varying the minimum target range of a radar system, wherein frequency modulated linear RF stretched waveforms having a predetermined bandwidth and duration are generated during successive transmit cycles, and wherein return signals having a frequency content corresponding to a range are received during successive receive cycles of a predetermined duration, comprises the following steps. The steps include segmenting each of the generated waveforms into a plurality of successive waveform segments, each of the plurality of waveform segments having a duration and frequency corresponding to a specific portion of the respective generated waveform; delaying commencement of each waveform segment a predetermined time interval subsequent to cessation of a preceding waveform segment of respective generated waveform; receiving target returns of the segmented waveform during the predetermined time intervals between cessation of one waveform segment and commencement of a successive waveform segment; combining the target return waveform segments to correspond to a target return of a generated waveform; and determining the range of the target in accordance with the frequency of the combined waveform segments.

In another aspect, the present invention is a radar system having a variable minimum target range, wherein the system comprises means for generating during successive transmit cycles frequency modulated linear RF stretch waveforms having a predetermined bandwidth and duration; means for segmenting the generated waveforms into a plurality of successive waveform segments each having duration and frequency corresponding to a specific portion of the respective generated waveform; means for delaying commencement of each waveform segment a predetermined time interval subsequent to cessation of a preceding waveform segments of the respective generated waveform; means for receiving target returns of the individual segments during the successive predetermined time intervals; means for combining the target returns of the waveform segments of a respective waveform to correspond to a target return corresponding to the duration of a respective waveform, and means for determining the range of the target return of the combined waveform segments.

The accompanying drawings, which are incorporated in and constitute part of this specification, illustrate one preferred embodiment of the invention, and together with the description, serve to explain the principles of the invention.

BRIEF DESCRIPTION OF THE DRAWINGS

FIGS. 4A and 4B illustrate graphically representative segmentations of the linear FM waveform for varying the minimum range in accordance with the present invention;

DESCRIPTION OF THE PREFERRED EMBODIMENT

Figure 1:
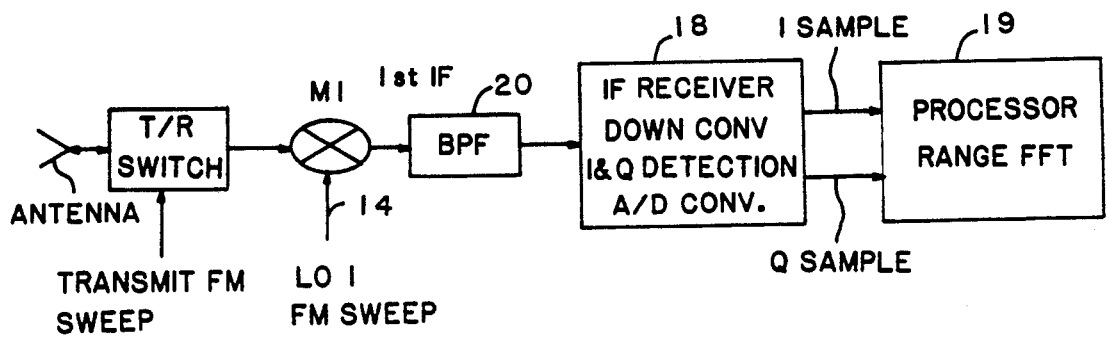
FIG. 1 is a schematic block diagram of a typical CW linear FM radar system.
Figure 2:
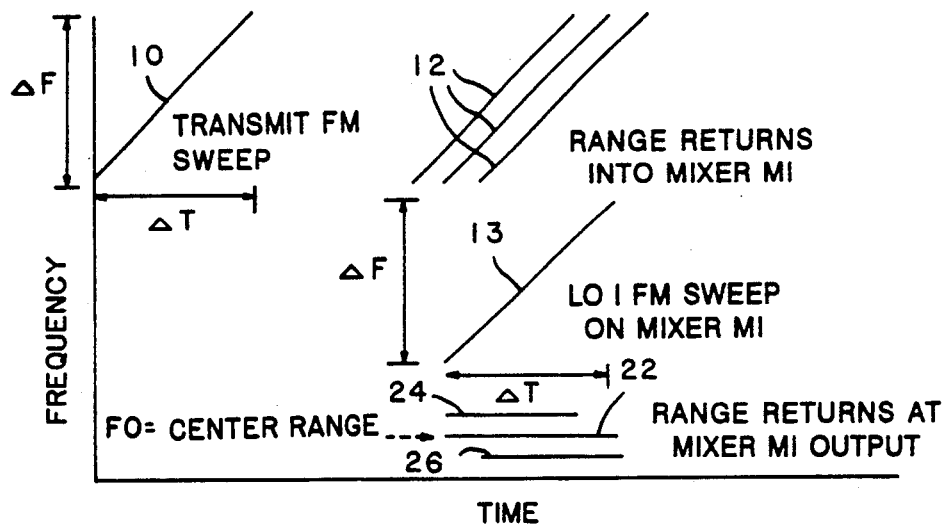
FIG. 2 is a graphical representation of the time relation of the system of FIG. 1.

A typical FM CW or high PRF PD radar system as shown by FIG. 1 transmits a linear FM stretched waveform 10 of a bandwidth $\Delta F$ in time interval $\Delta T$ as shown in FIG. 2. During each receive cycle linear FM returns 12, enter mixer M1 where the FM is removed by an identical $\Delta F$, $\Delta T$ sweep 13 which is applied to local oscillator 101 port referred to at 14 of FIG. 1. The signal then enters first IF receiver down conversion operation 18 through a first IF bandpass filter 20. The I+Q samples are then processed at 19 by a fast fourier transform. The target range that produces a radar return synchronous with the mixer sweep time $\Delta T$ generates a CW signal 22 of duration $\Delta T$ at the first IF center frequency FO (FIG. 2). Targets offset farther or closer in range produce deviations from frequency FO represented by lines 24 and 26 respectively proportional to the range offset and hence range.

The method and system of the present invention provides for varying the minimum detectable target range of a radar system of the type wherein frequency modulated (FM) linear RF stretched waveforms having a predetermined bandwidth $\Delta F$ and duration $\Delta T$ are generated during successive transmit cycles and with each pulse having a duration $\Delta T$; and target returns are received during receive cycles subsequent to each transmit cycle having a frequency content corresponding to a predetermined target range.

Figure 3:
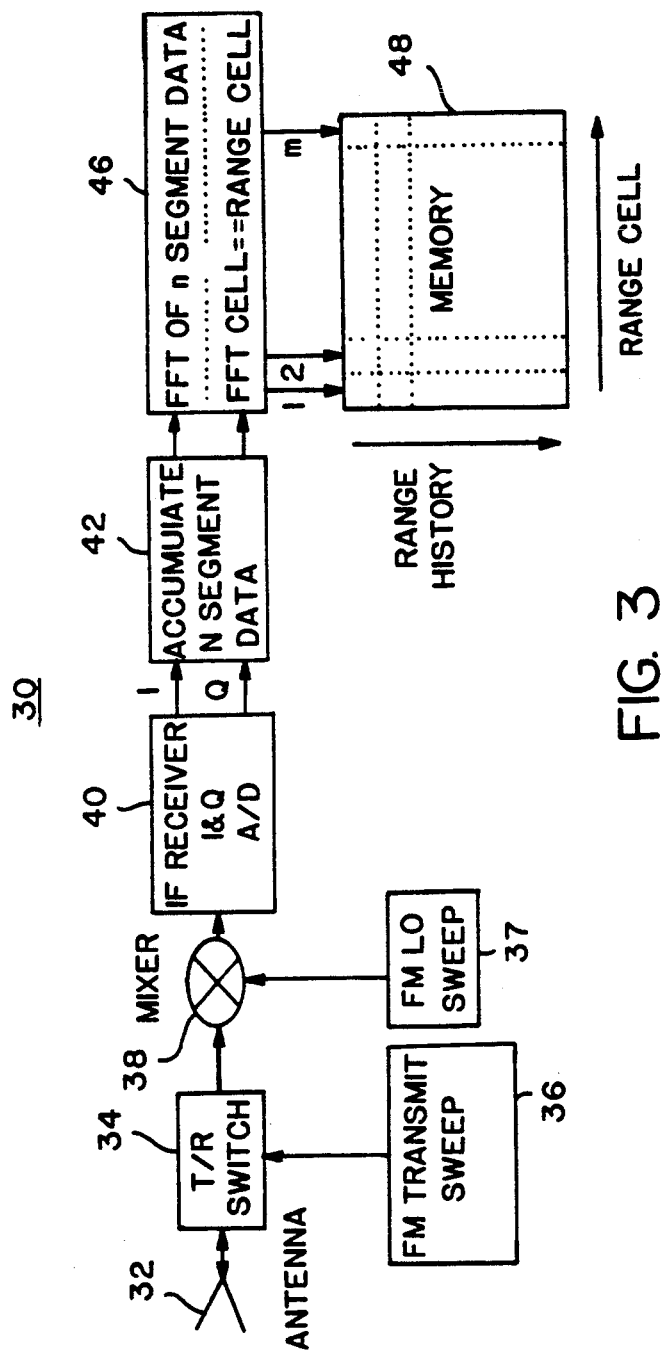
FIG. 3 is a schematic block diagram of a linear FM system incorporating the principles of present invention.

As herein embodied and referring to FIG. 3, a radar system generally referred to as 30 includes an antenna 32 for radiating during each transmit cycle, which is governed by a conventional T/R switch 34, a linear FM stretched transmit waveform or segmented waveform, as the case may be, generated by a transmitter represented at block 36. During receive cycles, governed by T/R switch 34, target returns are sensed by antenna 32 and mixed with a generated waveform or waveform from a local oscillator 37 at a mixer 38. The mixed waveform segments are then down converted and the FM removed from the waveform or waveform segment at a first intermediate frequency (IF) receiver included in representative block 40. The waveforms and waveform segments are quadrature detected at block 40 in a well known manner and output over lines I and Q for processing.

In accordance with the invention, the generated linear FM waveforms are divided into a plurality of waveform segments wherein each of plurality of waveform segments have a duration $\Delta T$ and frequency $\Delta F$ corresponding to a specific portion of the respective generated waveform; and the commencement of each waveform segment is delayed a predetermined time interval subsequent to the cessation of a preceding waveform segment of a respective generated waveform.

As embodied herein and referring to FIG. 3 the waveforms are separated into a plurality of successive delayed waveform segments for transmission at block 36, and to local oscillator block 37 for mixing with the target return signal at mixer 38.

Figure 7:
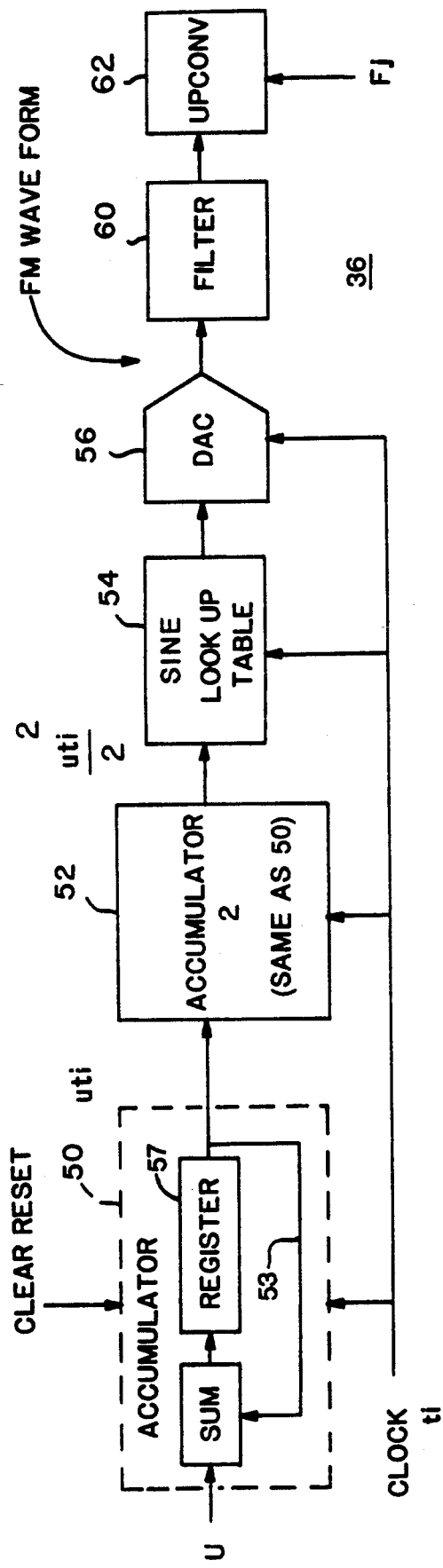
FIG. 7 is a block diagram of a system for generating and digitizing the FM waveform segments.

Referring to FIG. 7, segmented FM sweeps are generated by direct digital synthesis. This allows for digital control of the FM sweep segment length $\Delta T$, the FM rate $\Delta F$ over $\Delta T$ and, also the time of occurrence and number of segments.

The required FM slope is set by digital word U on the input of accumulator 50. Accumulator 50 is a simple digital integrator, as indicated by the register 51; and summation and feedback loop 53. It integrates the defined value U over the time interval $\Delta T$. The result is the digital sequence $Ut_i$ defining a linear phase as a function of time. Here $t_i$ defines system clock sample times, and U is a constant over the integration interval $\Delta T$. Digital accumulator 52 integrates the accumulator 50 output over the same $\Delta T$ time interval, at sample times $t_i$. This generates the quadratic digital phase term $$\frac{UT_i^2}{2}.$$

The digital quadratic phase sequence is used to reference a sine look-up table 54. The output of the sine look-up table is the desired FM waveform, still in a digital format. The digital FM waveform is converted to an analog signal in a Digital to Analog Converter (DAC) 58. The DAC output is filtered at 60 to remove digital sample aliasing. The waveform is then upconverted 62 to the desired segment band center frequency. The selected segment center frequency being determined by $F_j$, a selectable mixer local oscillator drive frequency.

When a new FM segment is required, at some defined time, the accumulator 50 and 52 registers are cleared, the integrators are restarted, and a new $F_j$, is selected for upconversion.

The system and method of the present invention includes receiving target returns of the segmented waveforms during the predetermined time intervals between cessation of one waveform segment and commencement of a successive waveform segment. As embodied herein, this is preferably accomplished by controlling T/R switch 34 to change cycles at different rates.

Each segment received in the sequence of N is down converted, quadrature detected, and sent to a system processor.

In accordance with the present invention the target return of the waveform segments are combined to correspond to a target return of a generated waveform. As herein embodied and again referring to FIG. 3, the processor converges the N segments into a single $\Delta T$ long segment at block 42. The $\Delta T$ interval is identical to that which would be obtained from a single $\Delta T$ long non-segmented waveforms transmission. An FFT performed on this combined $\Delta T$ interval determines the frequency content and thus target range. Block 42 for accumulating N segment data may be a conventional accumulator.

The system and method of the present invention includes determining the range of the target in accordance with the frequency of the combined segments of a waveform. Referring to FIG. 3, a fast fourier transform (FFT) is performed at block 46, and the combined intervals determine the frequency content of the target return waveform segments. This information is fed to a memory 48 which determines the range history and range of the FFT transform combined segments of a single waveform. The FFT processor feeds back to the segment generator for changing the tracking range.

A more detailed description of the method of the present invention will be given in connection with the operation of the system and explanation of the graphical illustrations. For detecting targets at far range, stretched waveforms of a predetermined length and RF bandwidth or slope $\Delta F$ such as 10 of FIG. 2 are transmitted for a duration $\Delta T$ during a transmit portion of an interpulse period which is also of a duration $\Delta T$; and received during successive receive portions of the interpulse intervals such as illustrated at 12 of FIG. 2. During this same time period local oscillator 37 is inputting sweep frequencies to mixer 38 for mixing with return target signals to be applied to first IF down converter or receiver 40.

For pulses 12 of FIG. 2, the minimum range corresponds to the duration $\Delta T$ of the generated pulse which corresponds to mixer sweep time of the interpulse interval for detecting synchronism at one of the sweep frequencies.

To establish a minimum range that is one half the minimum range of a system transmitting a linear FM waveform corresponding to a complete waveform, waveform 12 is divided in two segments as shown in FIG. 4A with each segment 50 and 52 having a duration $\Delta T/2$ with interpulse receive periods T(RCV) following each segment 50 and 52 of waveform 12. In this method the slope of waveform 12 remains the same as well as the bandwidth of the total number of segments. In the event, it is desired to further reduce the minimum range of the system, waveform 12 is divided into four waveform segments 54, 56, 58, and 60 with a receive period $T(RCV_4)$ of the same duration following each segment (FIG. 4B). As seen in FIGS. 4A and 4B, minimum range corresponds to $\Delta T$ divided by the number of interpulse periods and multiplied by $\frac{1}{2}$ the speed of light C, which can be expressed as:

$$\text{Range Minimum} = \frac{\Delta T}{N} \cdot \frac{C}{2}$$

Thus, when the waveform is divided into two waveform segments with interpulse periods divided in half, the minimum range is $$\frac{\Delta T}{2} \cdot \frac{C}{2}$$

as shown in FIG. 4A; or $$\frac{\Delta T}{4} \cdot \frac{C}{2}$$

as shown in FIG. 4B.

The stretch waveform of bandwidth $\Delta F$ and delay $\Delta T$ is broken into segments of duration $\Delta T/N$. Each segment is of bandwidth $\Delta F/N$ and also offset center to center by $\Delta F/N$ in frequency as shown in FIGS. 4A and 4B. Each segment is transmitted on a successive PRF interval followed by a receive interval time. For targets at long ranges N is set equal to 1.0. As the radar and target converge N is increased, for example, in multiples of 2, reducing the minimum range.

In practicing the present invention, it is important to obtain an accurate estimate of the Doppler offset. This estimate is usually moved in the first receive down conversion along with the FM of the segment. If the estimate is incorrect or nonexistent, a phase shift from segment to segment tends to produce multiple false range indications in the composite of the N segments. The receive portion was analyzed using a computer simulator of the receiver and FFT function.

Figure 5:
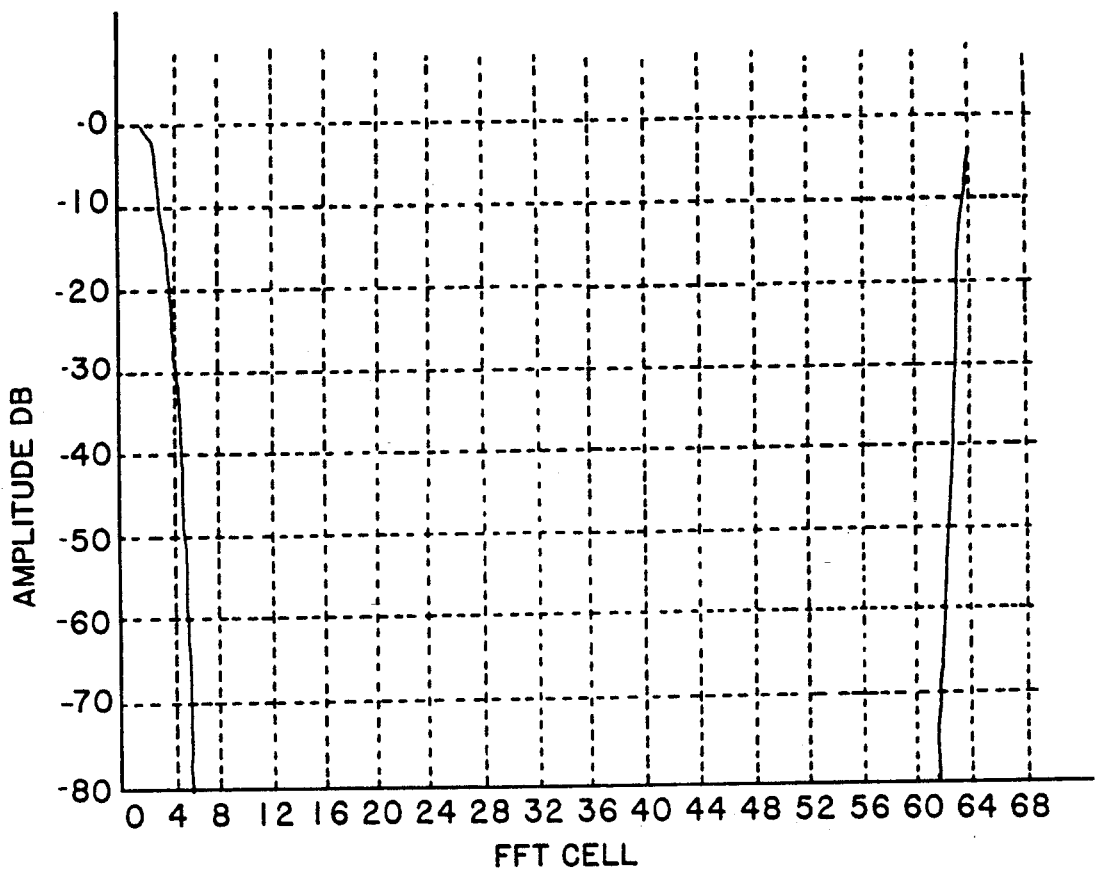
FIG. 5 is a graphical representation of a fast fourier transform output for a four segment linear FM sequence with a target at mid range and no Doppler error.
Figure 6:
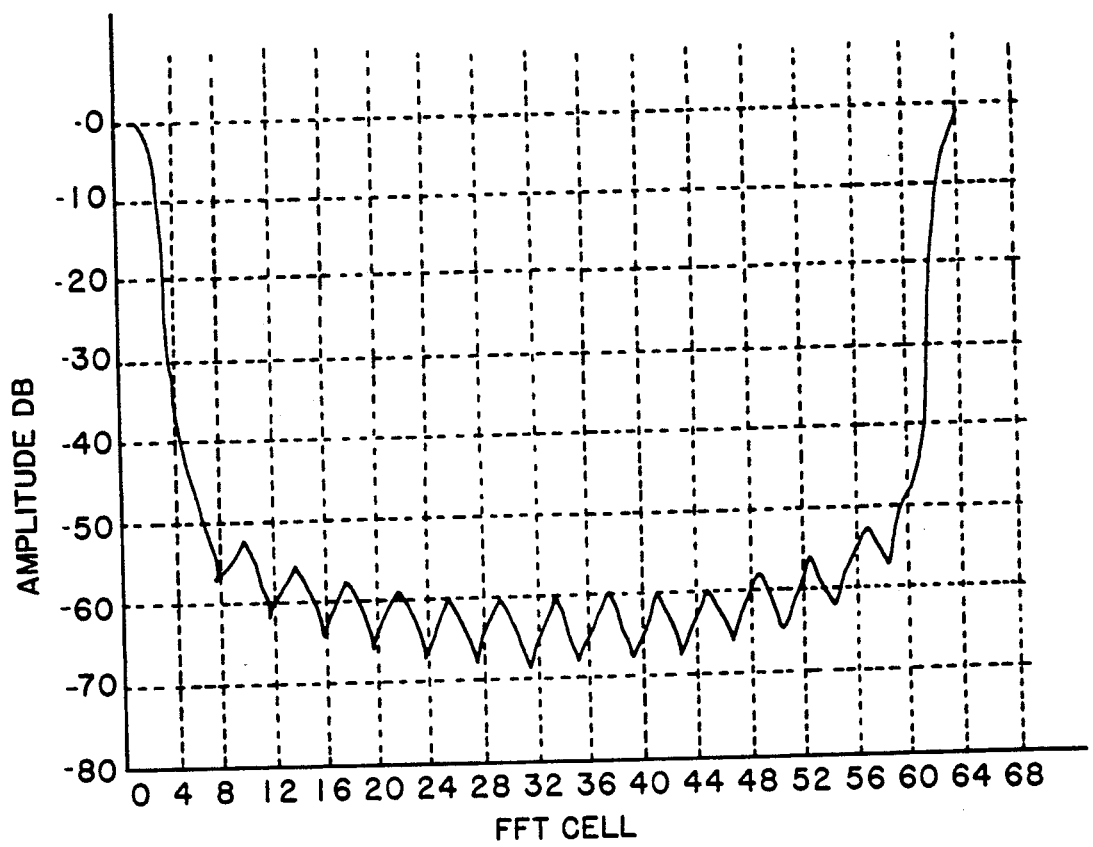
FIG. 6 is a graphical representation similar to FIG. 5 with a Doppler error equivalent to 2 meters per second velocity error.

The results are shown in FIGS. 5 and 6. In FIG. 5 a four segment system FFT output is shown. This result assumed 16 samples per segment for a total of 64 samples in FFT. The target is at center range (Fo in 1st IF) with no Doppler tracking error. FIG. 6 shows the same situation, but with a 2.0 meter/sec velocity error in the Doppler estimate. Note that sidelobes appear at harmonics of 4, which is the number of segments. These sidelobes are tolerable for most applications; and the Doppler error used is large compared to what is achievable with current trackers.

In summary, the present invention provides a system and method wherein the waveform provides the advantages of a step frequency waveform with respect to wide range resolution bandwidth and narrow IF-video bandwidth, at close ranges. The waveform also exhibits good Doppler sampling capability and provides full RF bandwidth on a given target over a time interval much longer than the closeness of range would normally allow. This insures the associated Doppler sampling capability of a maximum interpulse period, and in addition a high duty factor. The waveform can accommodate wide variations in target range and track to very short ranges while providing constant range resolution, range extent, and Doppler measurement capability.

It will be apparent to those skilled in the art that various modifications and variations can be made in the method and system of the present invention without departing from the spirit or scope of the present invention. Thus, it is understood that the present invention, covers modifications and variations thereof provided they come with the scope of the appended claims and their equivalents.

What is claimed is:

1. A method of varying the tracking range in a wide bandwidth high duty factor radar system, wherein frequency modulated linear RF stretched waveforms having a predetermined bandwidth and duty factor are generated during successive transmit cycles, and return signals having frequency content corresponding to a predetermined target range are received during successive receive cycles of a predetermined duration, the method comprising the steps of:

segmenting each generated waveform into a plurality of successive waveform segments, each of the plurality of waveform segments having a duration and frequency corresponding to a specific portion of the respective generated waveform;

delaying commencement of each waveform segment a predetermined time interval subsequent to cessation of a preceding waveform segment of a respective generated waveform;

receiving target returns of the segmented waveforms during the predetermined time intervals between cessation of one waveform segment and commencement of a successive waveform segment;

providing motion compensation to received target signals such that the signals from successive segments can be processed via a common Fast Fourier Transform algorithm;

combining the target return waveform segments to correspond to a target return of a generated waveform; and Fast Fourier Transform processing for determining the range of the target in accordance with the frequency of the combined waveform.

2. The method of claim 1, wherein the step of segmenting each generated waveform includes dividing the linear RF waveform into a predetermined number of waveform segments of equal duration.

3. The method of claim 1 wherein the step of delaying commencement of each waveform segment includes delaying each succeeding waveform segment of a waveform at equal predetermined time intervals.

4. The method of claim 1 wherein the step of delaying commencement of each waveform segment includes delaying each succeeding waveform segment of a waveform at predetermined time intervals equal to the duration of each preceding waveform segment for a respective waveform.

5. The method of claim 1 wherein each transmit cycle has a duration N, each generated waveform pulse has a duration $\Delta T$, each received target waveform has a duration corresponding to $\Delta T$ and each waveform has a frequency $\Delta F$, said step of segmenting including:

dividing the generated waveform into spaced waveform segments where the delay of each waveform segment corresponds to $\Delta T/N$, and each waveform segment has a frequency $\Delta F/N$.

6. The method of claim 1 wherein the step of segmenting the FM modulated waveforms includes dividing each waveform by either two or a multiple of two; and the step of delaying commencement of each waveform segment includes a time interval corresponding to the duration of each segment of a respective waveform.

7. The method of claim 1 wherein motion compensation is applied in terms of complex multiply to effect a differential phase shift to be applied between adjacent segments and where the differential phase shift is proportional to closing velocity.

8. A radar system having a variable target tracking range, the system comprising:

means for generating during successive transmit cycles frequency modulated linear RP stretch waveforms having a predetermined bandwidth and duration wherein the generating means includes segmenting the generated waveforms into a plurality of successive waveform segments and delaying commencement of each waveform segment a predetermined time interval subsequent to cessation of each preceding waveform segment, each segment having a duration and frequency corresponding to a specific portion of the respective generated waveform;

means for receiving target returns of the waveform segments during the successive predetermined time intervals;

means for combining the target returns of the waveform segments of a respective waveform to correspond to a target return having a duration corresponding to the respective waveform; and means for determining the range of the target return of the combined waveform segments.

9. The radar system of claim 8 wherein the means for generating comprises means for dividing each generated waveform either by two or multiples of two.

10. The radar system of claims 9 wherein the receiving means includes means for quadrature detecting the down converted waveform segments.

11. The radar system of claim 10 wherein the means for determining the range of the combined target return includes means for performing an FFT on the combined waveform.

12. The radar system of claim 8 wherein the means for generating comprises means for delaying waveform segments for equal predetermined time intervals, each time interval corresponding to the duration of a preceding waveform segment.

13. The radar system of claim 8 wherein the receiving means includes means for down converting to IF each waveform segment of a corresponding linear waveform.

* * * * *